United States Patent
Perkes

(10) Patent No.: US 7,040,772 B2
(45) Date of Patent: May 9, 2006

(54) VEHICLE MIRROR

(75) Inventor: Jason Stephen Perkes, London (GB)

(73) Assignee: Russell Keith Ambrose, London (GB)

( * ) Notice: Subject to any disclaimer, the term of this patent is extended or adjusted under 35 U.S.C. 154(b) by 0 days.

(21) Appl. No.: 10/480,976

(22) PCT Filed: Jun. 14, 2002

(86) PCT No.: PCT/GB02/02717

§ 371 (c)(1),
(2), (4) Date: Dec. 15, 2003

(87) PCT Pub. No.: WO02/102621

PCT Pub. Date: Dec. 27, 2002

(65) Prior Publication Data

US 2004/0165292 A1    Aug. 26, 2004

(30) Foreign Application Priority Data

Jun. 15, 2001    (GB) ................. 0114712.3

(51) Int. Cl.
*G02B 5/08* (2006.01)
*G02B 7/18* (2006.01)

(52) U.S. Cl. .................... 359/843; 250/206
(58) Field of Classification Search ............... 359/843
See application file for complete search history.

(56) References Cited

U.S. PATENT DOCUMENTS

| 3,640,609 | A |   | 2/1972  | McKee et al. |
| 3,854,821 | A | * | 12/1974 | Thompson ............ 356/139.08 |
| 4,625,329 | A | * | 11/1986 | Ishikawa et al. ............ 382/104 |
| 4,679,158 | A |   | 7/1987  | Tate |
| 4,779,095 | A |   | 10/1988 | Guerreri |
| 4,784,011 | A |   | 11/1988 | Riley |
| 5,132,851 | A |   | 7/1992  | Bomar et al. |
| 5,189,561 | A |   | 2/1993  | Hong |
| 5,479,297 | A |   | 12/1995 | Summers |
| 5,627,688 | A |   | 5/1997  | Valentino |
| 5,684,647 | A |   | 11/1997 | Rouleau |
| 5,706,144 | A | * | 1/1998  | Brandin ....................... 359/843 |
| 5,719,713 | A |   | 2/1998  | Brown |
| 5,765,116 | A |   | 6/1998  | Wilson-Jones et al. |
| 5,798,575 | A | * | 8/1998  | O'Farrell et al. .......... 307/10.1 |
| 5,953,167 | A |   | 9/1999  | Valentino |
| 5,980,048 | A |   | 11/1999 | Rannells, Jr. et al. |
| 6,151,175 | A |   | 11/2000 | Osha |
| 6,193,380 | B1 | * | 2/2001  | Jacobs ........................ 359/843 |
| 6,264,337 | B1 |   | 7/2001  | Rannells, Jr. et al. |
| 6,390,631 | B1 |   | 5/2002  | Lang et al. |
| 6,397,137 | B1 | * | 5/2002  | Alpert et al. .................. 701/49 |
| 6,501,371 | B1 | * | 12/2002 | Munch ........................ 340/436 |
| 2003/0016125 | A1 |   | 1/2003  | Lang et al. |

FOREIGN PATENT DOCUMENTS

| DE | 4228794 A1 | * | 3/1994 |
| EP | 00659610 B1 |   | 3/1998 |
| EP | 00764094 B1 |   | 1/1999 |

(Continued)

*Primary Examiner*—Mark A. Robinson
(74) *Attorney, Agent, or Firm*—Anthony R. Barkume, P.C.

(57) ABSTRACT

A mirror assembly for an articulated vehicle (1, 2) incorporates an image sensor which detects a specific image on the trailer so that as the vehicle (1, 2) turns left the image sensor maintains the image in its field of view and the mirror is automatically adjusted to maintain the driver's view.

11 Claims, 3 Drawing Sheets

FOREIGN PATENT DOCUMENTS

| | | |
|---|---|---|
| EP | 1 022 191 A2 | 7/2000 |
| EP | 1 022 191 A3 | 2/2001 |
| EP | 00830985 B1 | 1/2002 |
| EP | 00914266 B1 | 4/2002 |
| EP | 00944495 B1 | 7/2002 |
| EP | 1027228 B1 | 8/2002 |
| EP | 1354764 A2 | 10/2003 |
| EP | 1321334 A3 | 2/2004 |
| GB | 2259064 A | 3/1993 |
| GB | 2 343 578 A * | 5/2000 |
| JP | 05-294183 A * | 11/1993 |
| JP | 05-301541 A * | 11/1993 |
| JP | 11-321495 A * | 11/1999 |
| WO | WO95/23079 | 8/1995 |
| WO | WO95/35224 | 12/1995 |
| WO | WO96/21582 | 7/1996 |
| WO | WO98/01320 | 1/1998 |

* cited by examiner

VEHICLE MIRROR

The present invention relates to mirrors for use with vehicles, particularly with articulated lorries or trucks.

It is well known that exterior or wing mirrors in vehicles can have a blind spot where the field of view of the driver is limited by the configuration and set up of the mirror, size of vehicle, the position of the driver etc. and there have been many arrangements and adjustable mirrors which enable this blind spot to be overcome.

With articulated vehicles and vehicles which are towing other vehicles particular problems can arise. For example in a right hand drive articulated vehicle the left hand wing mirror is set up to provide the appropriate view down the left hand side of vehicle when the vehicle is being driven in a straight line. When the vehicle turns left this field of view will change as the front towing section of the vehicle on which the mirror is mounted turns at a different angle and in a different arc to the towed section. This can drastically reduce the field of visibility of the driver and will result in a much larger blind area.

With articulated vehicles a significant proportion of serious and fatal accidents occur where the left hand side of the vehicle is the first point of contact and in the majority of these accidents lack of visibility is at least a contributory factor. In driving schools for heavy goods vehicles there are special accident prevention courses to try to overcome this problem.

Attempts have been made to have mirrors which change their angle when the steering wheels of the vehicle are tuned, but these involve complex mechanical linkages and have to be installed when the vehicle is built.

We have devised an improved self adjusting wing mirror which can be fitted to any vehicle including articulated heavy vehicles.

According to the invention there is provided a mirror assembly for a vehicle, which mirror assembly incorporates a mirror having a reflective surface, a mirror adjusting means and an image sensing means whereby the mirror adjusting means is able to adjust the orientation of the reflective surface of the mirror in response to images perceived by the image sensing means.

The invention also provides a vehicle incorporating the mirror assembly and the invention is particularly useful in vehicle which are towing a trailer, caravan, boat, horse-box etc.

In use, the mirror is adjusted automatically in the normal way to give the driver the appropriate view in the reflective surface of his mirror and the image sensing means is set up to detect a specific image. When the vehicle turns, the specific image will start to move out of the field of view of the image sensing means, the image sensing means then adjusts itself so that the specific image stays in its field of view and this causes the mirror adjusting means to adjust the reflective surface of the mirror so as to maintain the appropriate field of view for the driver.

Preferably the image sensing means and the mirror are directly attached to each other and the movement of the image sensing means and the reflective surface of the mirror are coupled so that, as the image sensing means adjusts to maintain the specific image in its field of view, the reflective surface of the mirror is correspondingly adjusted.

The image sensing means can be in the form of a camera or other image detector or sensor such as a photodetector etc. Preferably the signals received by the image sensing means are digitised and are an input into a computing element such as an electronic control unit etc. This computing element can control a moving means for the image sensing means such as a motor, so that the orientation of the image sensing means is controlled thereby. As the purpose of the image perceived by the image sensing means is only to detect the movement of a specific image, that being an image within which a trailer vehicle is visible, it has enhanced image recognition features to detect the trailer. In most cases the ability to detect a contrast in colour or brightness, such as at an edge, is adequate and the specific image detected can be an area of such contrast e.g. the end of the articulated section of the vehicle or a strip of bright or strongly reflective material stuck on the vehicle. Alternatively there can be a light or other distinguishable feature fixed to the vehicle for detection and this forms the specific image. This feature or light will be already existing on the trailer and be considered a standard component or part of the trailer.

The system can incorporate other detection software so that it can detect other road users, obstacles, persons etc. and can cause a warning signal or sound when such other road uses, obstacles, persons etc. are detected, the warning can be incorporated in the mirror or it can be in the driver's cab etc.

The mirror adjusting means can be any of the conventionally used means which are widely used on vehicles to operate electrically mirrors from inside the vehicle. In the present invention the orientation of the reflective surface of the mirror is controlled by the orientation of the image sensing means instead of the driver of the vehicle.

There can be an indicator light which will be automatically activated when the mirror adjusting means and image sensing means are operating, this indicator light can be located at a convenient location e.g. in the mirror housing etc. The indicator light can be a steady light or it can flash in a manner similar to indicator lights.

Preferably the mirror assembly incorporates a means to transmit additional data to modules that are integrated to the vehicle's electrical system e.g. by direct cable connection or by infrared or wireless remote link. This would enable there to be, for example, supplementary control of the whole vehicle turn indicator circuit. This could come into effect when articulation is sensed and can activate the suitable turn signals on the vehicle. The turn signals on the vehicle can be activated independently of hazard warning or reversing light circuits or in addition to these lighting circuits. If these a combination of theses lights are activated together and an input from the mirror system indicator is sensed then these lights may be flashed together or in a preprogrammed sequence.

If there is a remote link within the mirror this can also be used to transmit data between a companion mirror fitted the other side of the vehicle. A rolling code would be enabled such that adjacent mirror systems on different vehicles will not interfere with each other. The positional adjustment of the companion mirror may be controlled from the transmitting mirror if this feature is fitted or the companion mirror may have its own image sensor fitted for independent control.

Preferably there is a remote control switch fitted within the cab that allows the driver to override the mirror system at will. The signal transmitted from this module to the mirror can be by a wireless link or can be wired into the vehicles power supply or powered by suitable battery device. The manual override control for the driver may also allow for a driver controlled up-own adjustment of the reflective mirror to accommodate different size drivers of the vehicle.

The image sensing means can be rigidly mounted to the mirror housing so that adjustment of the mirror surface by the adjusting means will not alter the position of the image sensing means. Alternatively the image sensing means can be mounted behind the mirror and connected to the mirror surface so Pat, as the mirror surface is adjusted, the visual field of view afforded by the image sensing means changes sufficiently to allow this. The image sensing means behind the mirror glass may be positioned such that it looks through the glass, or is positioned behind the plane of the mirror but beyond the perimeter edge of the mirror. If the image sensing means looks through the glass the glass may be coated with a one way mirror material such that the imaging sensor looks through the glass but from the reflective side there is no interruption of the reflective surface.

In the embodiment in which the image sensing means is mounted above or below the mirror glass but still contained within the mirror housing, the housing may be required to have a slightly physical shape to accommodate the sensor in the lower or upper region of the mirror housing.

The mirror assembly of the invention can be retrofitted to vehicles in place of existing mirrors and, in the case of electrically operated mirrors, this is a simple straightforward replacement.

The invention is illustrated in the accompanying drawings in which.

Figure 1:
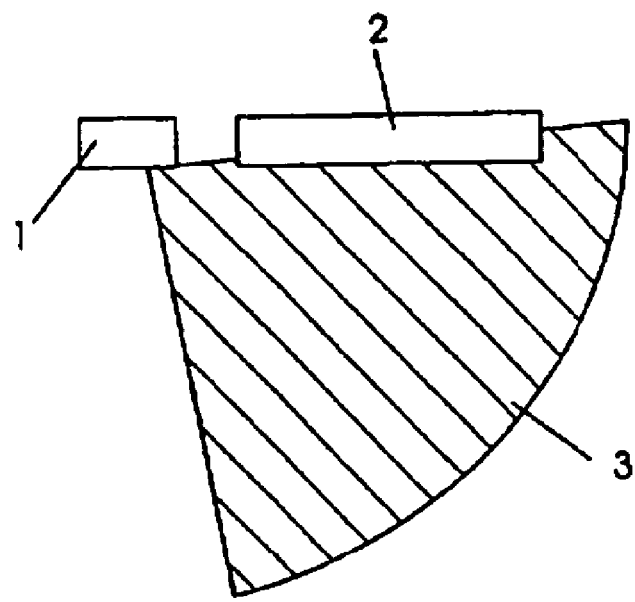
FIG. 1 shows an articulated vehicle driving straight.
Figure 2:
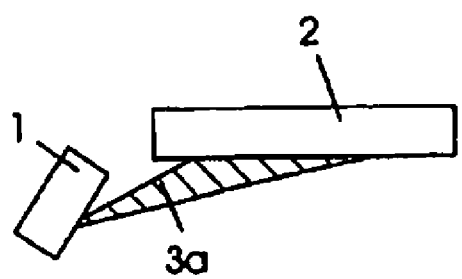
FIG. 2 shows an articulated vehicle turning left using a conventional wing mirror.
Figure 3:
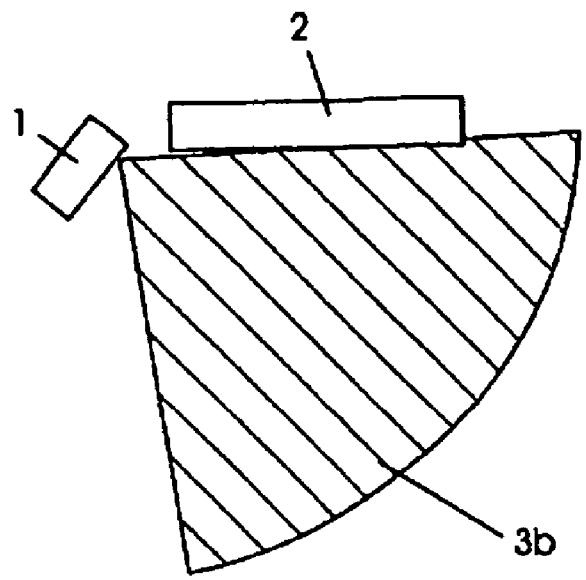
FIG. 3 shows an articulated vehicle turning left using an embodiment of the invention as a wing mirror.

In the drawings an articulated vehicle comprises a driving section (1) towing a trailer (2) in which the driver's field of view in the left hand wing mirror is shown by (3). In FIG. 2 the vehicle is turning left and the driver's field of view is reduced to (3a). In FIG. 3 with a wing mirror of the invention the driver's field of vision is expanded to (3b).

Figure 4:
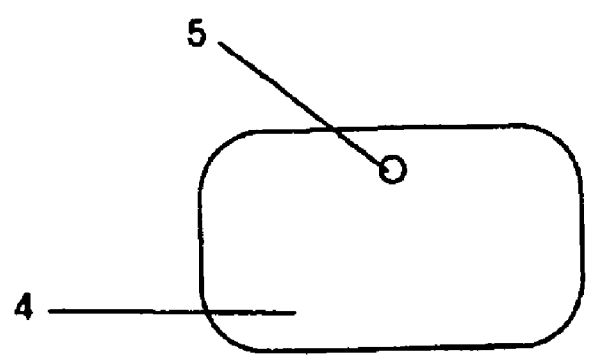
FIG. 4 shows an embodiment of a mirror incorporating an image sensor.

Referring to FIG. 4 a mirror assembly incorporates a reflective surface (4) in which there is a transparent opening (5) into which fits an image sensor such as a digital camera. The output from the camera is used to control a motor which turns the reflective surface to control its orientation As the towing vehicle turns left the image sensor controls the motor so that a specific image stays in its field of view and this automatically orients the reflective surface to maintain the driver's field of view.

Figure 5:
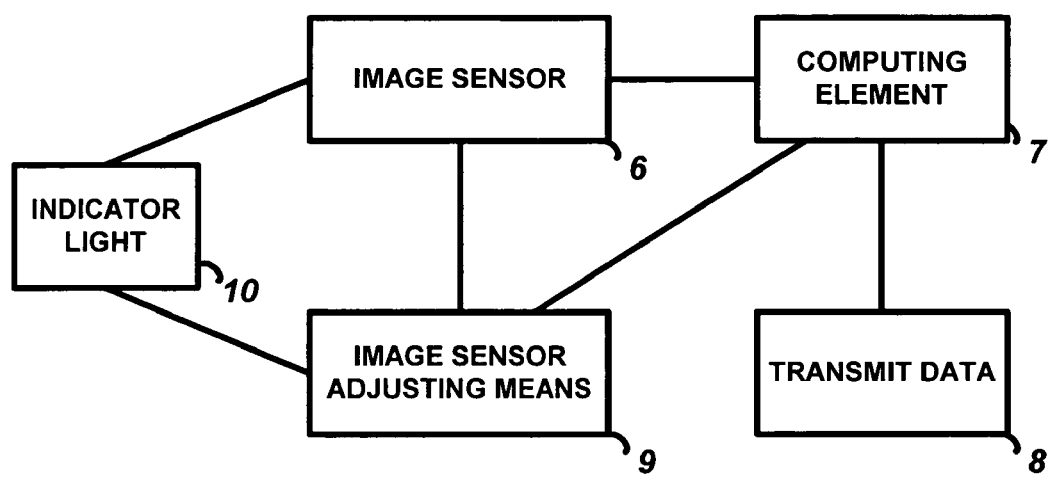
FIG. 5 shows a block diagram of the invention.

FIG. 5 illustrates an image sensor 6 that is operably connected to an image sensor adjusting means 9. An indicator light 10 is shown connected to the image sensor 6 and as previously described may be mounted in the housing. A computing element 7 is also shown, which is connected to the image sensor 6, which inputs signals into the computing element 7. Also shown is a means to transmit data 8 such as image data received by the image sensor and sent to the computing element 7. All of these elements shown in FIG. 5 interoperate with the invention as described throughout this specification.

The invention claimed is:

1. A mirror assembly for a vehicle, which mirror assembly incorporates (i) a mirror having a reflective surface, (ii) a mirror adjusting means and (iii) an image sensing means whereby the mirror adjusting means is able to adjust the orientation of the reflective surface of the mirror in response to images perceived by the image sensing means, wherein the image sensing means incorporates an image sensor adjusting means so that, in use, the image sensor adjusting means can adjust the image sensing means so that a specific image stays in the field of view of the image sensing means and the mirror adjusting means adjusts the reflective surface of the mirror accordingly, and further wherein the image sensing means and the mirror are directly attached to each other and the image sensing means and the reflective surface of the mirror are coupled so that, as the image sensing means adjusts to maintain the specific image in its field of view, the reflective surface of the mirror is correspondingly adjusted.

2. A mirror assembly according to claim 1 in which the image sensing means is mounted within the reflective surface of the mirror.

3. A mirror assembly according to claim 1 in which the image sensing means is mounted behind the reflective surface of the mirror.

4. A mirror assembly according to claim 3 in which the reflective surface comprises one way glass and the image sensing means is able to perceive images through the reflective surface of the mirror.

5. A mirror assembly according to claim 1 in which the image sensing means is mounted beyond the perimeter of the reflective surface of the mirror.

6. A mirror assembly according to claim 1 in which the mirror assembly incorporates a means to transmit additional data.

7. A mirror assembly according to claim 1 in which there is an indicator light which will be automatically activated when the mirror adjusting means and image sensing means are operating.

8. A mirror assembly according to claim 1 in which the image sensing means is mounted behind the mirror and connected to the reflective surface so that, as the reflective surface is adjusted, the visual field of view afforded by the image sensing means changes sufficiently to allow this.

9. A mirror assembly according to claim 8 in which the reflective surface comprises one way glass and the image sensing means is able to perceive images through the reflective surface of the mirror.

10. A mirror assembly according to claim 1 in which the image sensing means is a camera or a photodetector.

11. A mirror assembly according to claim 1 in which there is a computing element connected to the image sensing means and the signals received by image sensing means are an input into the computing element, there being a moving means for the image sensing means controlled by the computing element.

* * * * *